March 2, 1943.    J. F. O'BRIEN    2,312,580
ELECTRICAL WIRING SYSTEM
Filed July 27, 1940    2 Sheets-Sheet 1

INVENTOR
Joseph F. O'Brien
BY
HIS ATTORNEY

March 2, 1943.    J. F. O'BRIEN    2,312,580
ELECTRICAL WIRING SYSTEM
Filed July 27, 1940    2 Sheets-Sheet 2
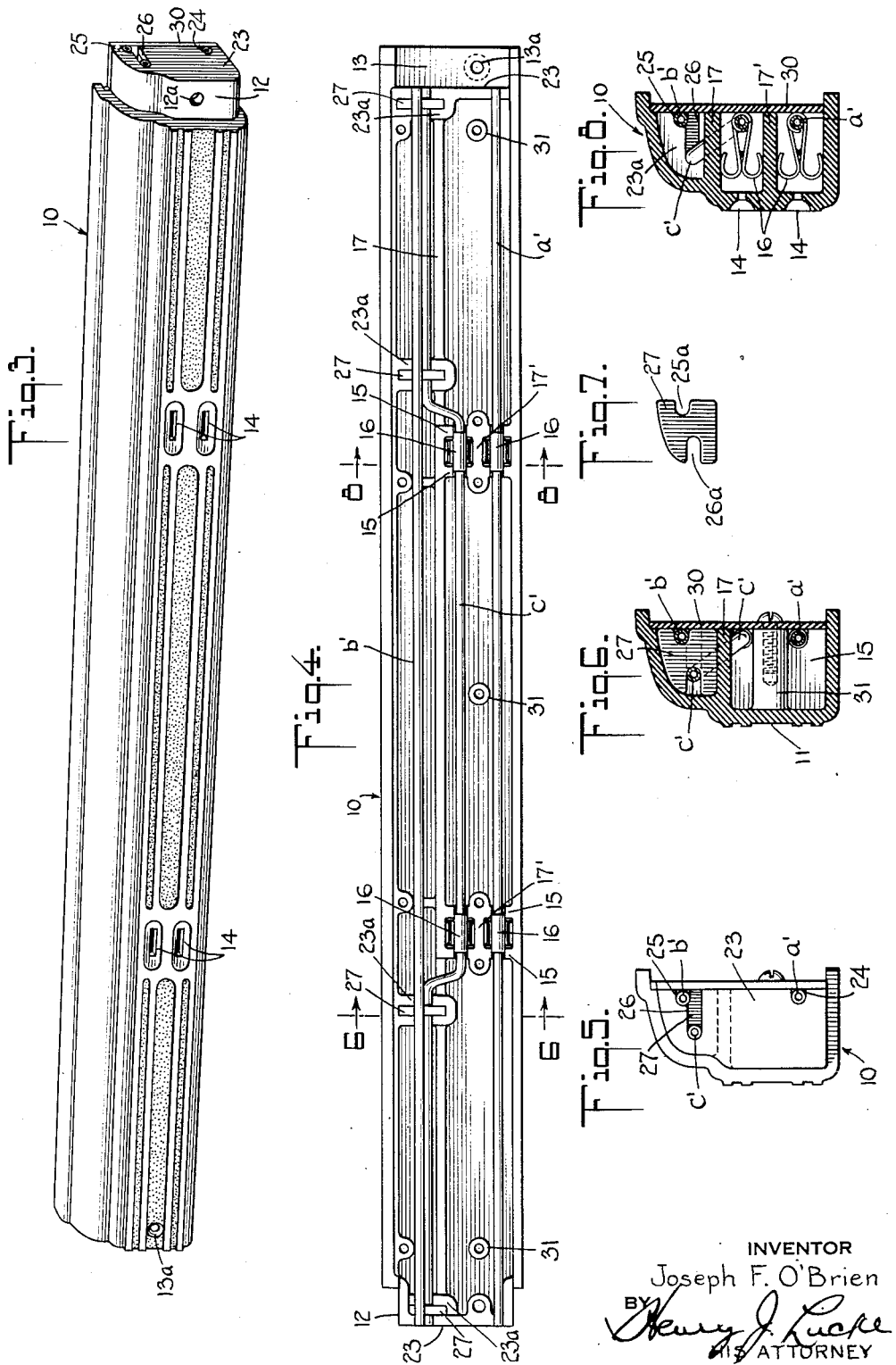
INVENTOR
Joseph F. O'Brien
BY
HIS ATTORNEY Patented Mar. 2, 1943

2,312,580

UNITED STATES PATENT OFFICE 2,312,580

ELECTRICAL WIRING SYSTEM

Joseph F. O'Brien, Jersey City, N. J., assignor to John B. Pierce Foundation, New York, N. Y., a corporation of New York Application July 27, 1940, Serial No. 348,059

8 Claims. (Cl. 173—334.1)

The present invention relates to improved electrical wiring systems.

In particular, the invention relates to wiring systems embodying a plurality of outlet-provided electrical conductor units arranged in seriatim electrical and mechanical interconnection, and embodying means whereby said outlet connection means of any one or a group of such interconnected units may be controlled by a local switch, whereas others may be independent of such switch and hence always in live circuit status.

The invention has particular advantages when installed, for example, in a residence. The seriatim interconnected units are adapted to be placed in an exposed location, desirably cooperating with the baseboard to form a decorative molding therefor, and present an electrical system in which outlet facilities are provided at frequent intervals. Pursuant to the invention, the seriatim connected units comprising the system may have outlet means which are continuously live, or controlled from a remote switch; groups of outlet-provided units may have either one or the other status, according to the installation plan. Electrical accessories such as floor lamps may be plugged into a switch-controlled unit; assuming the switch to be placed convenient to a doorway, the floor lamp may be turned on, by operation of the switch, upon entering the room. Other accessories, such as an electric clock, should be in continuous operation regardless of the operative condition of the switch, and hence such accessories may be plugged into the continuously live units.

It is an object of the present invention to provide an electrical wiring system comprising a plurality of serially interconnected conductor units, of which outlet-provided conductors of certain units are in continuously live status, whereas the outlet-provided conductors of other units may be in a switch-controlled circuit.

It is an object of the invention to provide an electric wiring system wherein conductor units having, optionally, switch-controlled or continuously live electrical characteristics may be interconnected according to any pre-arranged plan.

It is an object of the invention to provide an electricity conductor unit having a plurality of conductors, with certain of which conductors electrical outlet means are associated. The arrangement of said outlet means with respect to the conductors is determined by whether the outlets are to be in a switch-controlled or continuously live circuit.

It is an object of the invention to provide an electricity conductor unit having the electric circuit characteristics described, while having standardized end connections to effect uniformity of interconnection regardless of whether the unit has switch controlled or continuously live outlet means.

According to the present invention, the electricity conductor unit may comprise a body formed from insulation material, and provided for the mounting of a plurality, desirably three, of electricity conductors in mutually insulated spaced relationship. Said body is provided with apertures to accommodate the prongs of a conventional electrical attachment plug; and it is a feature of the invention that certain of the conductors within the insulating body are operatively associated with plug-receiving spring contact means according to whether the outlet is to be in continuously live or switch-controlled arrangement.

As a convenient means of arranging the conductors within a unit, one conductor may be continuously live, and may traverse the unit without deviation or offset. Disposed at an opposite side of the unit body, are a pair of electricity conductors of like polarity, but opposite from said first-named conductor, uniformly and accurately positioned at the end faces of the unit. In the vicinity of the outlet apertures of the unit, however, one or the other of said pair of conductors is carried into registry with such apertures, whereupon the securement of a contact clip or equivalent for operative association with a contact clip or equivalent provided on the continuously live conductor determines the electrical characteristic of the outlet of such unit.

To facilitate the construction of the units and the positioning of the conductors therein, it is preferred to have removable back means for the unit bodies, and to provide such bodies with bridge means or equivalent arranged, in cooperation with such backing means, to maintain the conductors in proper operative association.

Other features and advantages will appear hereinafter.

In the accompanying drawings:

Fig. 3 is a perspective of the unit, particularly showing the male connection end thereof and the standardized arrangement of conductors thereat;

Fig. 4 is a rear view of a conductor unit, the rear closure plate of the same having been removed to show one arrangement of conductors and outlet connection means therein;

Fig. 5 is a male end view of the unit of Fig. 3;

Fig. 6 is a sectional view taken through 6—6 of Fig. 4;

Fig. 7 is an elevation of the conductor spacing means;

Fig. 8 is a section taken through 8—8 of Fig. 4;

Figure 1:
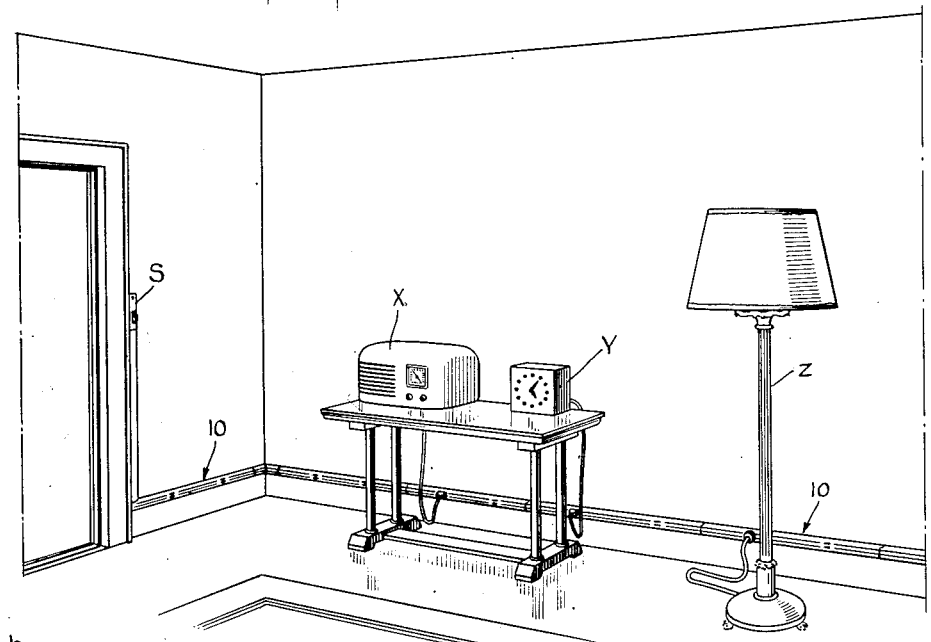
Fig. 1 is a perspective of an installation of my improved wiring system, showing a typical arrangement of electrical accessories of which certain are to be switch-controlled and certain are to be non-switch controlled.

Referring to the drawings, and specifically to Fig. 1, there is illustrated a wiring system embodying the present invention, and comprising a plurality of electrical conductor units interconnected to afford means whereby the attachment facilities of certain of said units may be switch-controlled and in other units, continuously alive; for example, in the arrangement of Fig. 1, the radio X and the electric clock Y derive their motive power from units of which the outlet connections are continuously alive, that is, non-switch controlled; the floor lamp Z is plugged into a unit to which the current flow is controlled by an electric switch S disposed adjacent the door.

Figure 2:
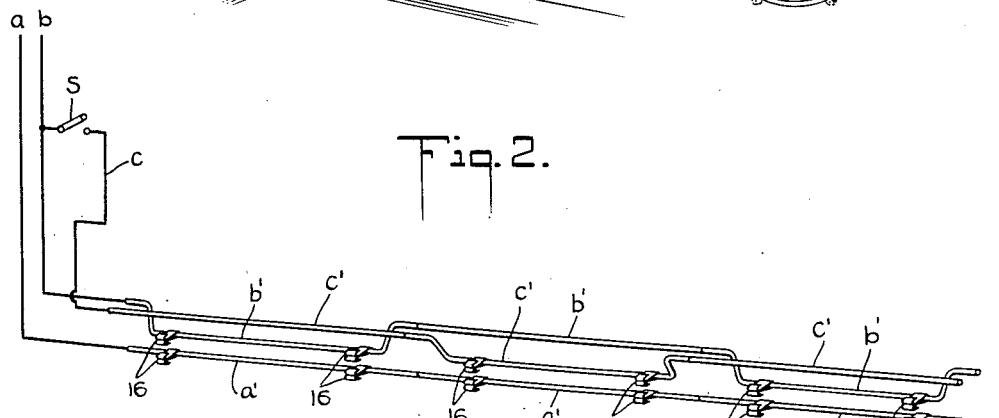
Fig. 2 is a schematic diagram of the conductors of interconnected wiring units, said conductors having outlet connections arranged to provide non-switch controlled and switch-controlled connection facilities.

Figure 2 shows, schematically, the conductors of three units embodying the present invention, and the manner in which said conductors are connected to a current source. "Lead" wire $a$ of a standard two wire electric system $a$, $b$, is a "hot" wire. Such conductor is electrically connected to the conductors $a'$, $a'$, $a'$, of the seriatim interconnected units.

"Return" wire $b$ of the electric power source is connected to conductors $b'$, $b'$, $b'$, of the conductor units. Conductors $c'$, $c'$, $c'$, of the electricity conductor units are electrically connected with a wire $c$ which is in turn, connected to a contact element of the electric switch S; the other contact of the single pole, single throw switch illustrated is connected to $b$ of the principal electrical circuit. Conductors $b'$ and $c'$ of each unit are, therefore, of the same polarity. Tracing the electrical circuit, it will be seen that conductors $a'$, $b'$ of each unit are in continually live circuit status, and, therefore, an electrical accessory connected to such conductors is arranged for continuous operation. On the other hand, a wiring circuit embodying conductors $a'$ and $c'$ is a switch-controlled circuit in that although conductors $a'$ are "hot" conductors, conductors $c'$ must pass through the switch S to reach "return" wire $b$ of the principal wiring system $a$, $b$.

As will later be indicated, the respective conductors $a'$, $b'$, and $c'$ are uniformly arranged at the ends of the conductor units; $a'$ and $b'$ are disposed at the base of the units, whereas $c'$ is disposed adjacent the outer wall of the unit. By such arrangement, the possibility of cross connection of the conductors $b'$ and $c'$ of each unit is eliminated.

Desirably, the conductors $a'$, $b'$, $c'$ are tubular, thereby providing for the electrical connection of the same by means of electrically conductive pins (not shown) frictionally inserted into the tubular ends of such electricity conductors.

Referring to Fig. 3, a conductor unit 10 comprises a body portion 11, advantageously formed of moldable plastic material, said body having a male extension 12 and a female socket end 13 so that contiguous units may be assembled in broken joint relationship to shield the conductors within such units against accidental short circuit.

The body 11 of each unit may have any suitable number of attachment plug receiving openings 14, 14; it is contemplated that the units 10 will be of standard length of approximately sixteen (16) inches, and two such attachment plug openings per unit are considered adequate for normal purposes.

The bodies 11 of the units are formed, see Figures 4 and 6, with preferably transverse integral partition walls 15, 15 which, in combination with lateral walls 17, 17' and a side wall of the body form insulated housings for the attachment plug connectors 16, 16.

As appears from Figs. 4, 5, and 6, conductors $b'$, $c'$, are disposed within a chamber formed by lateral wall 17 and a side wall of the housing, except where a portion of one or the other of said conductors is brought into adjacency with conductor $a'$.

For the segregation and securement of conductors of like polarity, and particularly to effect the uniformity of positioning of the conductors at the ends of the units, the unit bodies are provided at or adjacent their ends with transverse walls 23, provided with notches 24, 25, at the base; as shown in Figure 5, notch 25 merges into a relatively deep notch 26.

As appears from Figs. 4, 5, and 6, substantial advantages accrue from positioning the conductors $b'$, $c'$ at different levels within the housing, for the depth rather than the width of the housing is utilized to maintain said conductors in suitably spaced relationship. It is obvious that if the conductors were all on the same plane, the body of the unit would have to be widened in order to attain the same relative spacing.

Additionally, transverse wall means 23a are provided interiorly of the body at spaced intervals along the length, said walls 23a having notches matching and registering with the notches 25, 26, previously referred to. Walls 23a desirably define pockets within which bridge members 27 of insulating material may be placed; said bridge members are formed, see Fig. 7, with a notch 25a and a slot 26a, which cooperate with their counterparts in the respective transverse walls to secure the conductors in the proper spaced relationship.

Conductors $a'$, $b'$, $c'$, of each unit are mounted to afford standardization of connection at the ends of the units. Accordingly, conductors $a'$, $b'$, of each unit are disposed adjacent the base thereof; conductor $a'$ is positioned in notch 24 of the transverse wall means 23 and similar notches in the transverse walls 15; conductor $b'$ is supported within notches 25, 25 respectively in the transverse walls 23, 23a. These conductors are maintained in operative position by the insulating backing strip 30, which is secured to the body of the unit by machine screws which pass into tapped holes in bosses 31 formed in the unit. Conductor $c'$ is disposed above conductor $b'$, being carried at its ends by the notches 26, and secured in position by the locking cooperation of the notch 26a in the respective bridge members 27, each of the latter being confined within a pocket formed by wall means 23a and the aforesaid backing strip 30.

It will be noted from a comparison of Figure 4 and Figure 2 that the conductor arrangement of Figure 4 corresponds to the schematic conductor arrangement of the intermediate unit of the Figure 2 wiring diagram. In other words, conductors $a'$ and $b'$ are respectively arranged for direct electrical connection with the "hot" wire $a$, and "return" wire $b$ of the source of electricity; conductor $c'$, on the other hand, is connected to wire $c$, which the switch S is adapted to connect to, or disconnect from, the "return" wire $b$.

It will be noted from a comparison of Figures 4, 6, and 8 that in the central zone of the unit 10, conductor $c'$ is offset and carried downwardly to the bases of the housings in which contact members 16 are located; contacts 16 are electrically connected to such conductor $c'$. The "hot" conductor $a'$ likewise has contact means 16 secured thereto; pairs of contacts 16, 16 are disposed in registry with the attachment plug receiving openings 14, 14.

The spacing and electrical insulation afforded by the transverse walls 23, 23a and the bridge members 27 insures a "cross over" of conductor $c'$ with respect to conductor $b'$ without possibility of electrical short circuit.

As clearly appears from Fig. 8, conductor $c'$, in the zone of its offset, slopes downwardly to the base of the unit 10, at which position all three of the conductors $a'$, $b'$, $c'$, are in a common plane, thus insuring uniformity of contacts 16 and adequacy of contact area thereof. To permit such sloping offset, the portion of the wall 17 adjacent the transverse walls 15 is of a suitable height.

According to such conductor arrangement, it is seen in Figure 2 that the contact members 16, 16 of such central (i. e., Fig. 4) unit are in a circuit controlled by switch S, and, therefore, a floor lamp or the like electrically connected to the contact means 16 will be in a closed electric circuit only upon a closing of the switch S in the conductor $c$. As is apparent, the path of current in the circuit runs through "hot" wire $a$ and its associated "hot" conductors $a'$, through the contacts 16 of such Fig. 4 unit and returns through conductors $c'$, wire $c$, and closed switch S to "return" wire $b$ of the electric power source.

Figure 9:
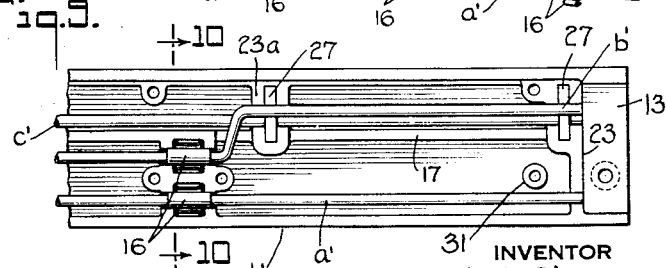
Fig. 9 is a rear view of a portion of one of the conductors units illustrating a second arrangement of conductors and outlet connection means therein.

Referring now to Fig. 9, it is noted that the conductors $a'$, $b'$, $c'$ are disposed pursuant to the standard arrangement hereinabove described. In this embodiment, also, "hot" conductor $a'$ has secured thereto a contact means 16, and conductor $b'$ is offset to register with the contact housings. A second contact means 16 is operatively associated with conductor $b'$, and as such arrangement corresponds to the first and third schematic units of Figure 2, it is apparent that the contact means 16 of such units are not subject to the operation of switch S and hence such contact means afford continuously live power outlets.

Figure 10:
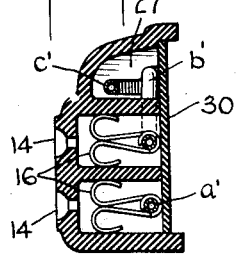
Fig. 10 is a section taken through 10—10 of Fig. 9.

As is seen in Figure 10, the offset of conductor $b'$ is accomplished without the necessity for substantial sloping of the conductor; the offset portion is in the plane of the backing strip 30, except insofar as offset is required by reason of the conductor means 16.

According to the present invention, therefore, any combination of Figure 4 or Figure 9 conductor arrangements may be made. Each wiring unit 10 has standardized conductor locations at its terminal ends, making it impossible for an installer to cross connect a conductor $b'$ with a conductor $c'$ in the seriatim interconnection of the units, and respective units may be positioned in the system pursuant to a predetermined conductor arrangement.

In the interconnection of conductor units 10, the male end 12 thereof interfits within the socketed end 13 of an adjacent unit, thus providing a broken joint of substantial extent, and effectively protecting the conductors against accidental short circuit.

To mutually secure adjacent conductors, and to provide means whereby the conductors may be secured to a wall structure or baseboard, the male end 12 of a unit may be provided with a hole 12a, and the overlapping cover portion of the socket 13 with a matching hole 13a, whereby upon positioning the conductors in seriatim association, holes 12a, 13a are in registry and provide for the passage of a wood screw or other fastening means. It will be apparent that the fastening means not only secure the units to the building structure, but also mutually secure the interconnected unit.

Whereas I have described my invention by reference to specific forms thereof, it will be understood that many changes and modifications may be made without departing from the spirit of the invention.

1. A multi-conductor electricity conductor unit arranged for seriatim electrical and mechanical interconnection with like conductor units: said unit comprising a housing having apertures affording entry of the blades of an electrical attachment plug; a plurality of electricity conductors disposed within said housing and coextensive therewith, two of said conductors being of the same polarity and positioned at different levels within said housing adjacent a side wall thereof, transverse wall means disposed within said housing and arranged to receive and uniformly position said conductors at said different levels, means cooperating with said transverse wall means to secure the conductors within said housing; an electricity conductor of opposite polarity extending longitudinally of said unit and having contact means in registry with an attachment plug aperture; one of said pair of conductors of the same polarity being offset to position a portion of its length intermediate its ends in registry with an aperture of said housing, said conductor having contact means disposed at said aperture to cooperate with said first-named contact means for electrical connection with the blades of an attachment plug.

2. A multi-conductor electricity conductor unit arranged for seriatim electrical and mechanical interconnection with like conductor units: said unit comprising a substantially hollow housing of electrical insulation material having apertures through a wall thereof affording entry of the blades of an electrical attachment plug; a longitudinal wall of electrical insulation material disposed within said housing and providing a chamber adjacent a side wall thereof; paired transverse walls extending between said longitudinal wall and a side wall of said housing, said transverse walls being provided with notches to receive and support electricity conductors at different levels; a pair of electricity conductors of identical polarity disposed within said chamber, said conductors occupying different levels therein and supported on said transverse walls, spacer means of electrical insulation material positioned between said paired transverse walls and configurated to cooperate with the notches thereof to secure the electricity conductors within said chamber; and an electricity conductor of opposite polarity disposed remote from said chamber and having contact means in registry with one of said apertures, one of said pair of conductors of similar polarity having an electric contact means disposed in registry with another of said apertures to cooperate with said first-named contact means for engagement with the respective conductors of an attachment plug.

3. A multi-conductor electricity conductor unit arranged for seriatim electrical and mechanical interconnection with like conductor units; said unit comprising a substantially hollow housing of electrical insulation material having apertures through a wall thereof affording entry of the blades of an electrical attachment plug, said housing being open at the back; a longitudinal wall of electrical insulation material disposed within said housing and providing a chamber adjacent a side wall thereof; paired transverse walls extending between said longitudinal wall and a side wall of said housing, said transverse walls being provided with notches to receive and support electricity conductors at different levels; a pair of electricity conductors of identical polarity disposed within said chamber, said conductors being insertable from the rear of said housing and occupying different levels therein and supported on said transverse walls, spacer means of electrical insulation material insertable from the rear of said housing positioned between said paired transverse walls and configurated to cooperate with the notches thereof to secure the electricity conductors within said chamber; and an electricity conductor of opposite polarity disposed remote from said chamber and having contact means in registry with one of said apertures, one of said pair of conductors of similar polarity having an electric contact means disposed in registry with another of said apertures to cooperate with said first-named contact means for engagement with the respective conductors of an attachment plug.

4. A multi-conductor electricity conductor unit arranged for seriatim electrical and mechanical interconnection with like conductor units; said unit comprising a substantial hollow housing of electrical insulation material having apertures through a wall thereof affording entry of the blades of an electrical attachment plug, said housing being open at the back; a longitudinal wall of electrical insulation material disposed within said housing and providing a chamber adjacent a side wall thereof; paired transverse walls extending between said longitudinal wall and a side wall of said housing, said transverse walls being provided with notches to receive and support electricity conductors at different levels; a pair of electricity conductors of identical polarity disposed within said chamber, said conductors being insertable from the rear of said housing and occupying different levels therein and supported on said transverse walls, spacer means of electrical insulation material insertable from the rear of said housing positioned between said paired transverse walls and configurated to cooperate with the notches thereof to secure the electricity conductors within said chamber; an electricity conductor of opposite polarity disposed remote from said chamber and having contact means in registry with one of said apertures, one of said pair of conductors of similar polarity having an electric contact means disposed in registry with another of said apertures to cooperate with said first-named contact means for engagement with the respective conductors of an attachment plug; and means for closing the rear wall of said housing and for confining said spacer means therein.

5. In an electricity conductor unit having a plurality of conductors, the combination with a hollow housing having paired transverse wall means formed with a plurality of notches to support said electricity conductors within said housing, of spacer means adapted to be inserted between said paired transverse walls and having complementary notches cooperating with said first-named notches to secure the electricity conductors within said housing.

6. In an electricity conductor unit having a plurality of uninsulated electricity conductors, the combination with a hollow housing, a plurality of transverse wall means of electrical insulation material arranged within said housing in relatively close mutually spaced relationship, said wall means having shoulders on which said conductors may be supported, of spacer means adapted to be positioned between said transverse walls, said spacer means having notches for cooperation with the shoulders on said wall means to secure the electricity conductors within said housing.

7. In an electricity conductor unit having a plurality of electricity conductors, the combination with a hollow housing, wall means arranged within said housing transversely thereof, said wall means having shoulders at different levels with respect to said housing for supporting the conductors thereon, of spacer means adapted to be positioned adjacent said wall means, said spacer means having notches for cooperation with the shoulders on said wall means to secure said electricity conductors at the selected levels within said housing.

8. In an electricity conductor unit having a plurality of electricity conductors, the combination with a hollow housing, wall means arranged within said housing transversely thereof, said wall means having shoulders at different levels with respect to said housing for supporting the conductors thereon, of spacer means adapted to be positioned adjacent said wall means, said spacer means having notches for cooperation with the shoulders on said wall means to secure said electricity conductors at the selected levels within said housing, and means for maintaining said spacer means in operative relationship within said housing.

JOSEPH F. O'BRIEN.